(12) United States Patent
Lape et al.

(10) Patent No.: US 8,235,369 B2
(45) Date of Patent: Aug. 7, 2012

(54) CART SUPPORT SYSTEM FOR DYNAMOELECTRIC MACHINE COILS

(75) Inventors: Brock M. Lape, Clifton Park, NY (US); Jeffrey D. Evans, Earlton, NY (US); Richard A. Harby, Albany, NY (US)

(73) Assignee: General Electric Company, Schenectady, NY (US)

( * ) Notice: Subject to any disclaimer, the term of this patent is extended or adjusted under 35 U.S.C. 154(b) by 332 days.

(21) Appl. No.: 12/706,807

(22) Filed: Feb. 17, 2010

(65) Prior Publication Data

US 2011/0198793 A1  Aug. 18, 2011

(51) Int. Cl.
*A47B 81/00* (2006.01)
*A47B 45/00* (2006.01)
*B25B 1/06* (2006.01)

(52) U.S. Cl. ........................ 269/216; 211/208

(58) Field of Classification Search .................. 269/216, 269/53; 280/79.3; 414/331.06–331.11; 211/208
See application file for complete search history.

(56) References Cited

U.S. PATENT DOCUMENTS

| | | | |
|---|---|---|---|
| 2,762,514 A * | 9/1956 | McGinn | 211/85.5 |
| 3,126,102 A * | 3/1964 | Krokos | 211/208 |
| 3,585,092 A * | 6/1971 | Storer | 156/182 |
| 4,321,498 A | 3/1982 | Vogt | |
| 4,572,980 A | 2/1986 | Anderson et al. | |
| 4,877,228 A * | 10/1989 | Ripert | 269/156 |
| 5,223,008 A * | 6/1993 | Troxell | 55/350.1 |
| 6,042,323 A * | 3/2000 | Cervantes et al. | 414/331.08 |
| 6,225,813 B1 | 5/2001 | Garwatoski | |
| 6,422,405 B1 * | 7/2002 | Haenszel | 211/175 |
| 6,634,836 B2 | 10/2003 | Nolan et al. | |
| 6,849,972 B1 | 2/2005 | Barnes et al. | |
| 7,259,583 B2 | 8/2007 | Marino et al. | |
| 7,275,300 B2 | 10/2007 | Clough et al. | |
| 7,547,999 B2 | 6/2009 | Laskaris et al. | |
| 7,806,394 B2 * | 10/2010 | Wuerthner | 269/133 |
| 2009/0133712 A1 * | 5/2009 | Lape et al. | 134/1 |
| 2010/0052278 A1 * | 3/2010 | Lape et al. | 280/79.3 |

FOREIGN PATENT DOCUMENTS

CN    201740854 U    2/2011

OTHER PUBLICATIONS

European Search Report issued in connection with corresponding EP application No. 1102611.9, Jun. 7, 2011.

* cited by examiner

*Primary Examiner* — David B Thomas
(74) *Attorney, Agent, or Firm* — James W. Pemrick; Ernest G. Cusick; Frank A. Landgraff

(57) ABSTRACT

A cart system is provided for a coil of a dynamoelectric machine. The cart system includes one or more support rails disposed substantially horizontally, a plurality of lifting rails disposed substantially vertically, and connected at one end to the one or more support rails, and a plurality of coil clamps for applying a compressive force. The coil clamps are attached to the lifting rails in a removable manner. The coil of the dynamoelectric machine can be placed on the cart system and the coil clamps can be arranged on the lifting rails to apply a compressive force to the coil to facilitate a testing procedure.

25 Claims, 7 Drawing Sheets

CART SUPPORT SYSTEM FOR DYNAMOELECTRIC MACHINE COILS

BACKGROUND OF THE INVENTION

The subject matter disclosed herein relates to a cart support system for dynamoelectric machine coils. More specifically, the subject matter disclosed herein relates to a cart support system for dynamoelectric machine coils that provides clamping means to allow testing of the coils under simulated load conditions.

Dynamoelectric machines such as electrical generators conventionally include a rotor and a stator. The rotor is conventionally provided with field windings (rotor coils) that excite the generator while receiving current from an excitation source. The stator is provided with windings (or coils) from which electrical power is output. At least some known coils/windings are formed with a plurality of copper conductors that are wound to form loops. More specifically, the coils/windings are arranged in such a manner to enable a desired voltage and current characteristic to be generated during operation.

Electrical insulation is wrapped around the rotor coils and stator windings to electrically isolate the coils/windings from subsequent layers. The insulation facilitates preventing arcing between the coils/windings, and also shields the conductors from foreign objects that could cause electrical shorts. However, the insulating properties of the insulation may degrade if the insulation becomes damp or is damaged (e.g., by vibration). Voltage arcs may occur from the conductors through degraded regions or wet regions of the insulation. Over time, continued operation with arcs may prematurely shorten the useful life of the generator.

To facilitate extending the useful life of the generator, the rotor coils and/or stator windings may be periodically tested. Within at least some known tests, groups of stator bars are "tied together" electrically and tested as a set, while the remaining bars are electrically grounded. Rotor coils/windings may be subject to various electrical tests, such as wind copper resistance tests, polarization index tests, AC impedance tests, overpotential tests and air gap flux probe tests. Insulation is used to isolate the various layers of the windings/coils from adjacent layers. If a fault exists in this insulation, damage to the machine could occur or efficiency could be affected. The various tests previously described are performed to identify any fault conditions or defects in the windings/coils before the components are installed in a generator. If defects are discovered, the location can be identified and the problem remedied (e.g., additional insulation is installed in the area of arcing and the test is re-performed). The process may need to be repeated several times before a successful test for the component under test may be performed at the required voltage level.

BRIEF DESCRIPTION OF THE INVENTION

According to an aspect of the present invention, a system is provided for a coil of a dynamoelectric machine. The system includes one or more support rails disposed substantially horizontally, a plurality of lifting rails disposed substantially vertically, and connected at one end to the one or more support rails, and a plurality of coil clamps for applying a compressive force. The coil clamps are attached to the lifting rails in a removable manner. The coil of the dynamoelectric machine can be placed on the system and the coil clamps can be arranged on the lifting rails to apply a compressive force to the coil to facilitate a testing procedure.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
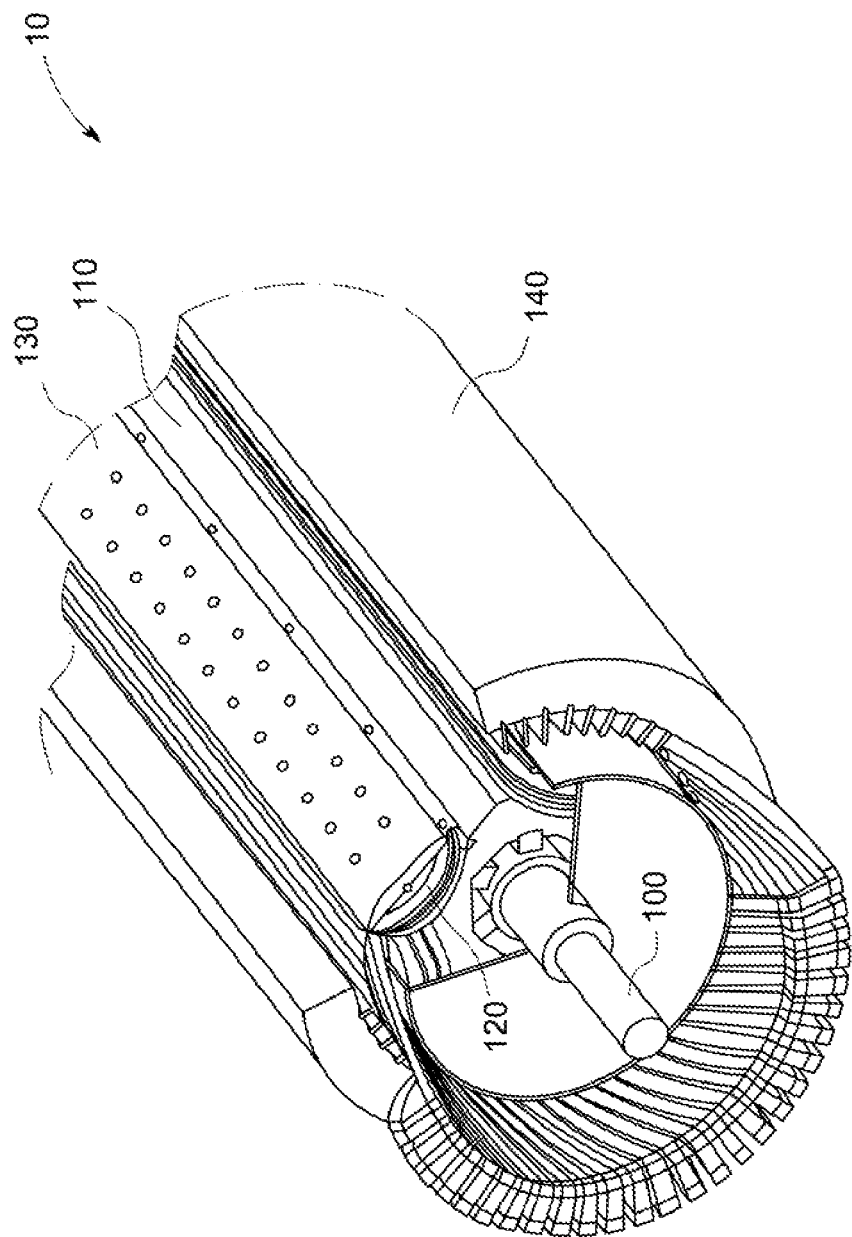
FIG. 1 illustrates a three-dimensional perspective view of a portion of a generator.

FIG. 1 illustrates a three-dimensional perspective view of a portion of a generator 10. Generator 10 may include a rotor 110 having a spindle 100 and groups of coils 120 (or windings) disposed about pole tips 130. A stator 140 is disposed about the rotor 110.

Experience has shown a generator field (e.g., a rotor) is a component that requires maintenance. This is not surprising considering that it is operating under very high centrifugal load and thermal cycling. At some point in time during the life of the generator, a rebuild of certain components may be desired. A rebuild of the field normally focuses on re-insulation of the field or rotor winding/coil. In some cases, a complete replacement of the old field may be preferred. Reliability of the generator field is increased with a rewind, as new modern insulating material can replace the original worn out insulation and address the latest service concerns. New copper coils may have a higher cross section, reducing the current density and heating. The stator windings can be similarly upgraded or replaced. During the upgrading/rewinding process, the new or upgraded winding/coil will need to be worked on and inspected in various stages. The stator windings and rotor coils are heavy components and are difficult to move and manipulate. The present invention provides an improved cart system for transporting, testing and working on stator and/or rotor windings/coils.

Figure 2:
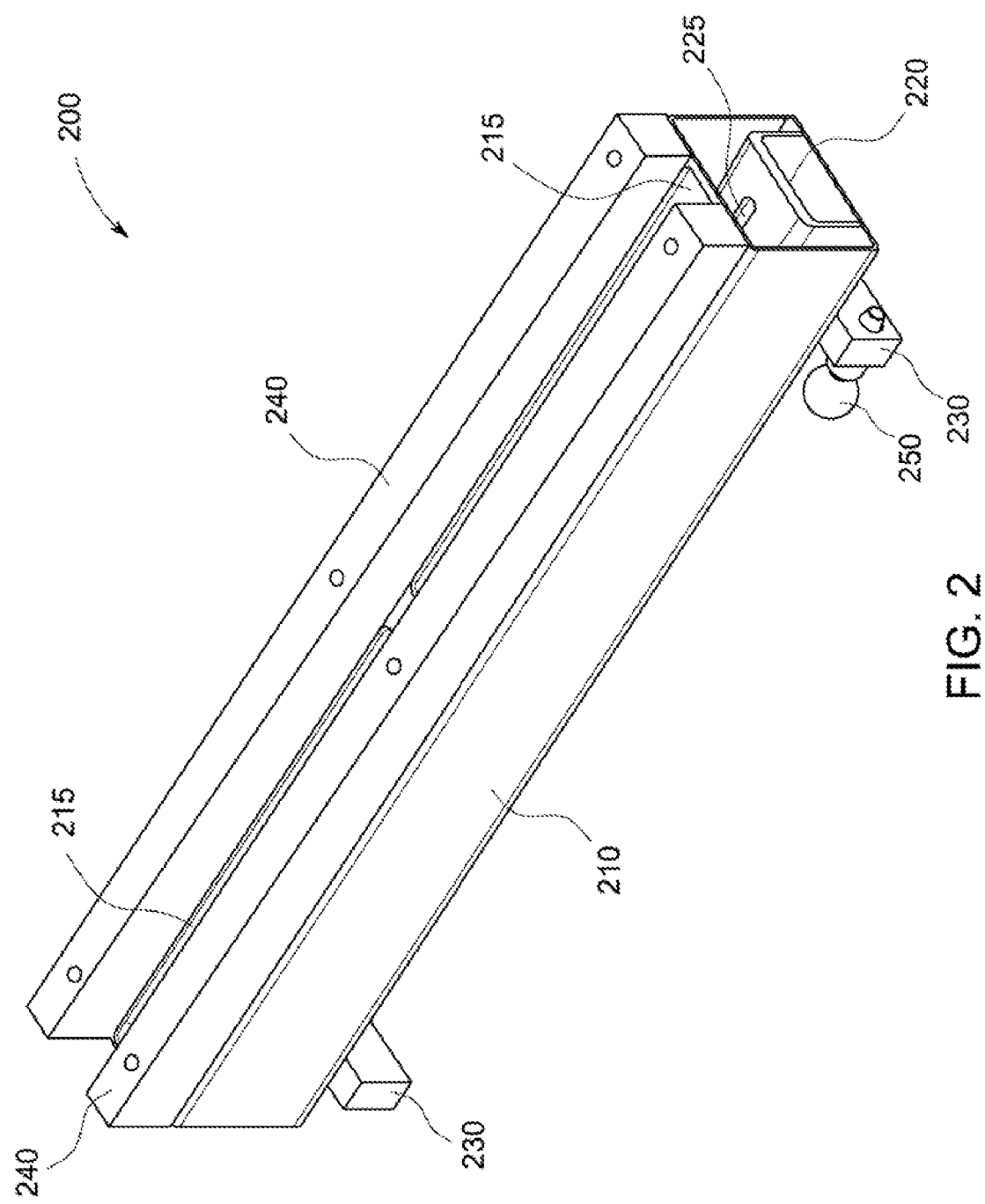
FIG. 2 illustrates an isometric view of a support rail, according to an aspect of the present invention.

FIG. 2 illustrates an isometric view of a support rail 200 that can be used with the cart system according to an aspect of the present invention. The support rail 200 is a foundation element for the cart system and includes a main rail body element 210, slotted internal support rail 220, foot element 230, coil bed members 240, and optional quick release pins 250 (only one shown). The top surface of the main body element 210 can include one or more slots 215 disposed in a portion thereof. The top surface of the internal support rail 220 may also include one or more slots 225 disposed in a portion thereof. The coil bed members may be fastened to the top surface of main body element 210 by the use of any suitable fastener (e.g., screws, bolts, nuts, adhesive, etc.). The coil bed members 240 are preferably formed of a material that will not damage the windings or coils of the stator or rotor. As non-limiting examples, the coil bed members 240 could be formed of copper, wood, wood composite or a polymeric material.

Figure 3:
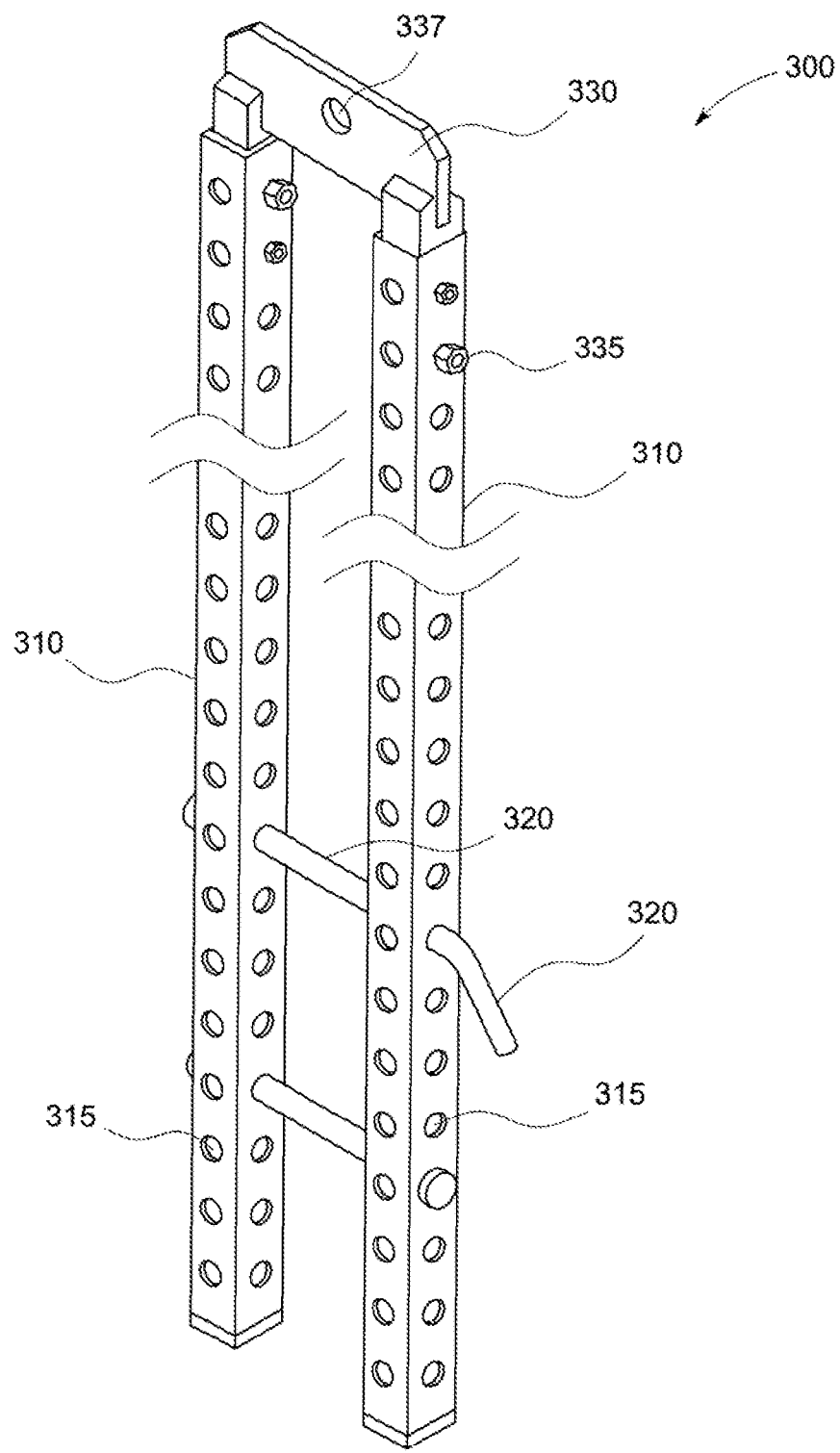
FIG. 3 illustrates an isometric view of a pair of lifting rails, according to an aspect of the present invention.

FIG. 3 illustrates an isometric view of a pair of lifting rails 300 that can be used in conjunction with the cart system according to aspects of the present invention. Each lifting rail 310 is comprised of an elongated member having a plurality of holes 315 formed therein. The holes form passageways that accept a pin 320. The pin 320 can be approximately "L" or "T" shaped or have a bend therein, and is configured to be insertable within holes 315. Typically, the pin 320 is inserted within two vertically aligned holes 315 on opposing sides of lifting rail 310. One or more pins 320 can be utilized to support various layers of the coil or winding of a rotor. Each lifting rail 310 may have a rectangular cross-section and may include multiple sections that could be adjustable. For example, each lifting rail 310 could be formed of multiple sections or multiple telescopic sections, and this or a similar arrangement could be used to provide for an adjustable height feature for each lifting rail 310.

A pair of lifting rails 310 can be joined at the top by a lifting coupling 330 and suitable fasteners 335. The fasteners 335 can be combinations of nuts, bolts and washers, or any other suitable fastening device. A hole 337 can be provided within lifting coupling 330 for facilitating the attachment of a lifting mechanism (e.g., a crane). In alternative arrangements, a hook, loop or any other suitable attachment point may also be employed. As one alternate example, a strap or hook may be passed under and around lifting coupling 330 and attached to a crane. Typical windings and coils are fairly heavy, so a crane or lifting device can be used to move the cart system and/or winding/coil.

Figure 4:
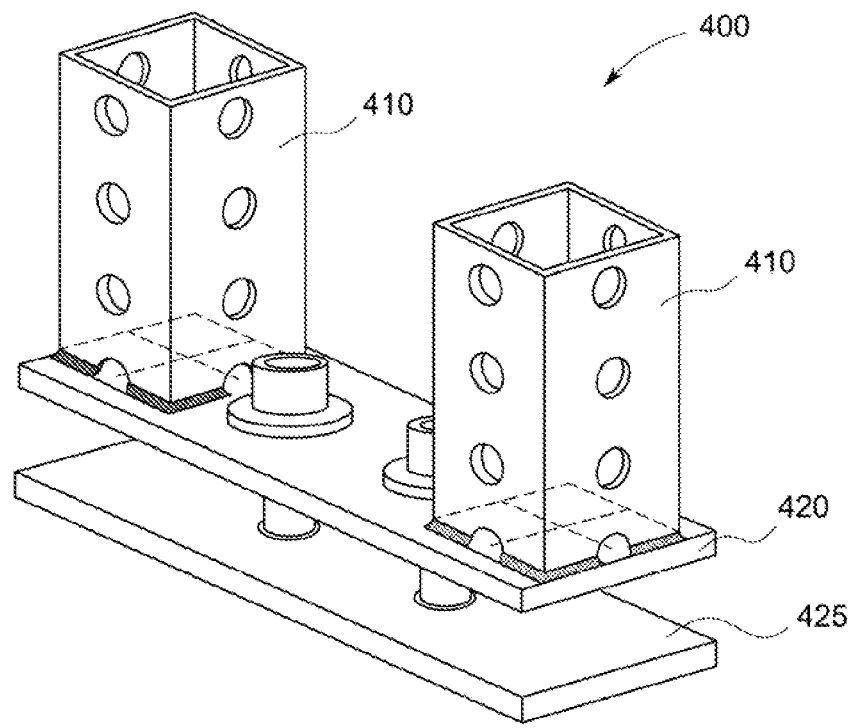
FIG. 4 illustrates an isometric view of an attachment point fixture, according to an aspect of the present invention.
Figure 5:
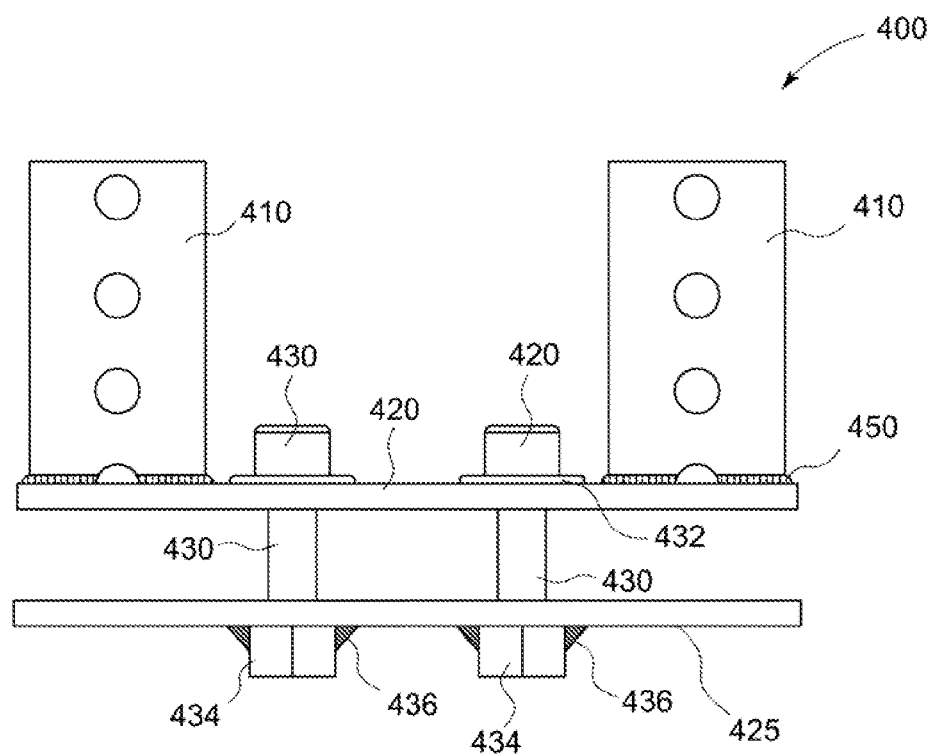
FIG. 5 illustrates a side view the attachment point fixture shown in FIG. 4, according to an aspect of the present invention.

FIG. 4 illustrates an isometric view of an attachment point fixture 400 that can be used with the cart system according to an aspect of the present invention. FIG. 5 illustrates a side view of the attachment point fixture 400. The attachment point fixture 400 can be attached to internal support rail 220, and is used to support and secure the lifting rails 310. The attachment point fixture 400 includes support members 410, that are sized to either fit outside of, or inside lifting rails 310. The support members 410 are preferably welded to a first back plate 420 via weld 450. The first back plate 420 is connected to a second back plate 425 via one or more fasteners. The fasteners may include bolt 430, washer 432 and nut 434. However, any suitable fastening means may be employed. The nut 434 can be welded to the second back plate via weld 436.

The attachment point fixture 400 can be attached to support rail 220 by orienting the fixture so that the first back plate 420 is above the top portion of support rail 220, the second back plate 425 is below the top surface, and the bolts 430 pass trough slot 225. In this manner, the attachment point fixtures 400 can be slid along slot 225 and secured at any desired location. The bolts 430 can be tightened to securely lock the fixture 400 at any of multiple locations along slot 225.

Figure 6:
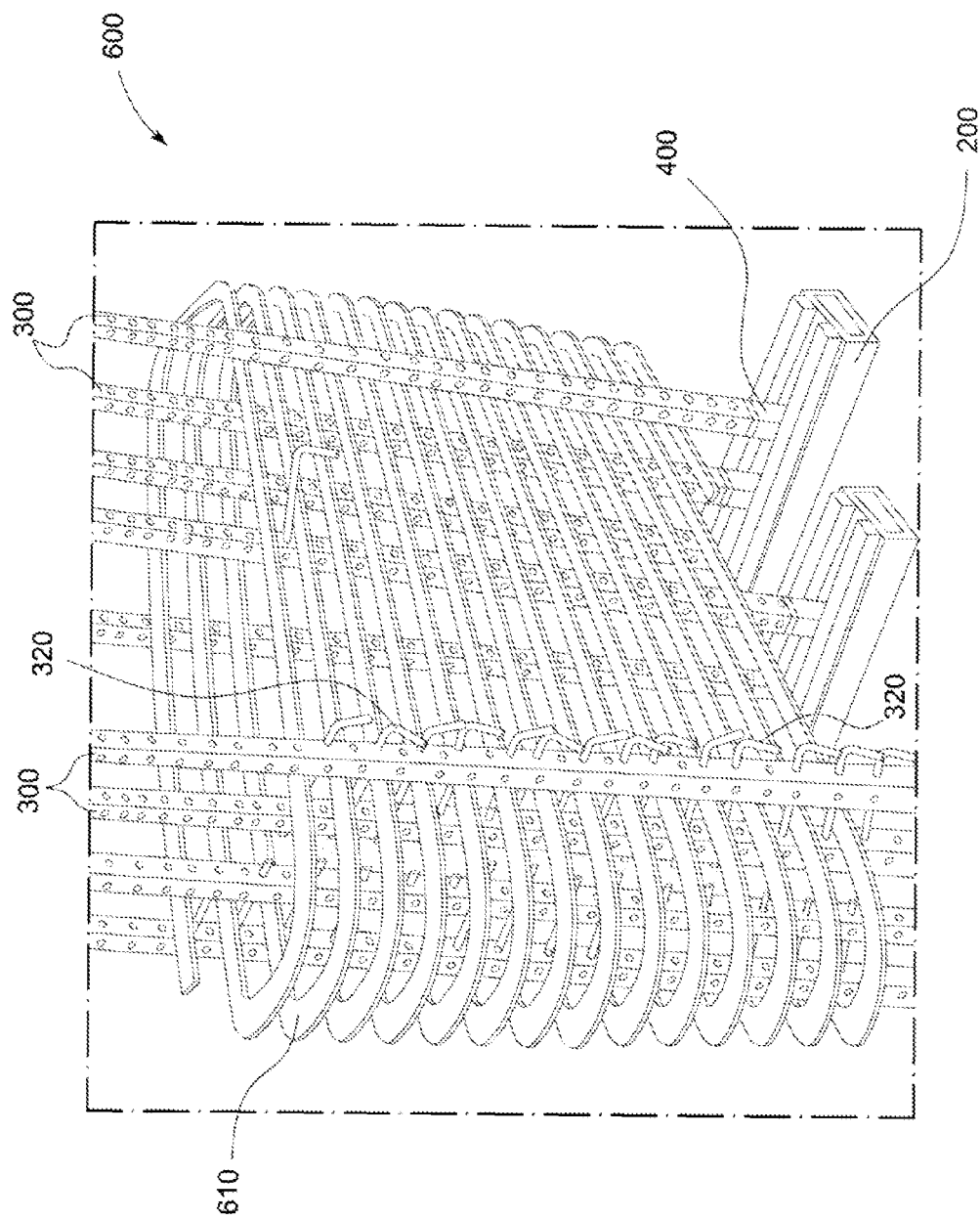
FIG. 6 illustrates a perspective view of a cart system combining the components shown in FIGS. 2-5 with a coil of a dynamoelectric machine, according to an aspect of the present invention.

FIG. 6 illustrates a perspective view of the cart system 600, including the elements shown in FIGS. 2-5, according to an aspect of the present invention. The support rails 200 are located at the bottom of the cart system 600 and function as a base support. The attachment point fixtures 400 are attached to the support rails 200 and support and secure the pairs of lifting rails 300. The lifting rails 310 may be used individually, in pairs or in groups of three or more. A generator's rotor coil 610 is shown expanded and supported by the cart system with the use of a plurality of pins 320. The individual layers of the coil are expanded to allow various inspections to occur. For example, the condition of the insulation around the coil may be inspected and/or tested. If defective regions of coil 610 are identified, they can be repaired. For example, a region with inadequate insulation could be repaired by restoring the region to desired specifications. The cart system 600 of the present invention, facilitates access to the coil 610. In addition the entire cart 600 and winding 610 may be moved to various work stations by the use of cranes or wheels (not shown). A crane could be attached to the lifting member 330 or other element, and used to transport the coil/cart to the desired location or work station. The cart system could also be mounted on a mobile cart or dolly system (not shown) for transport as well.

Figure 7:
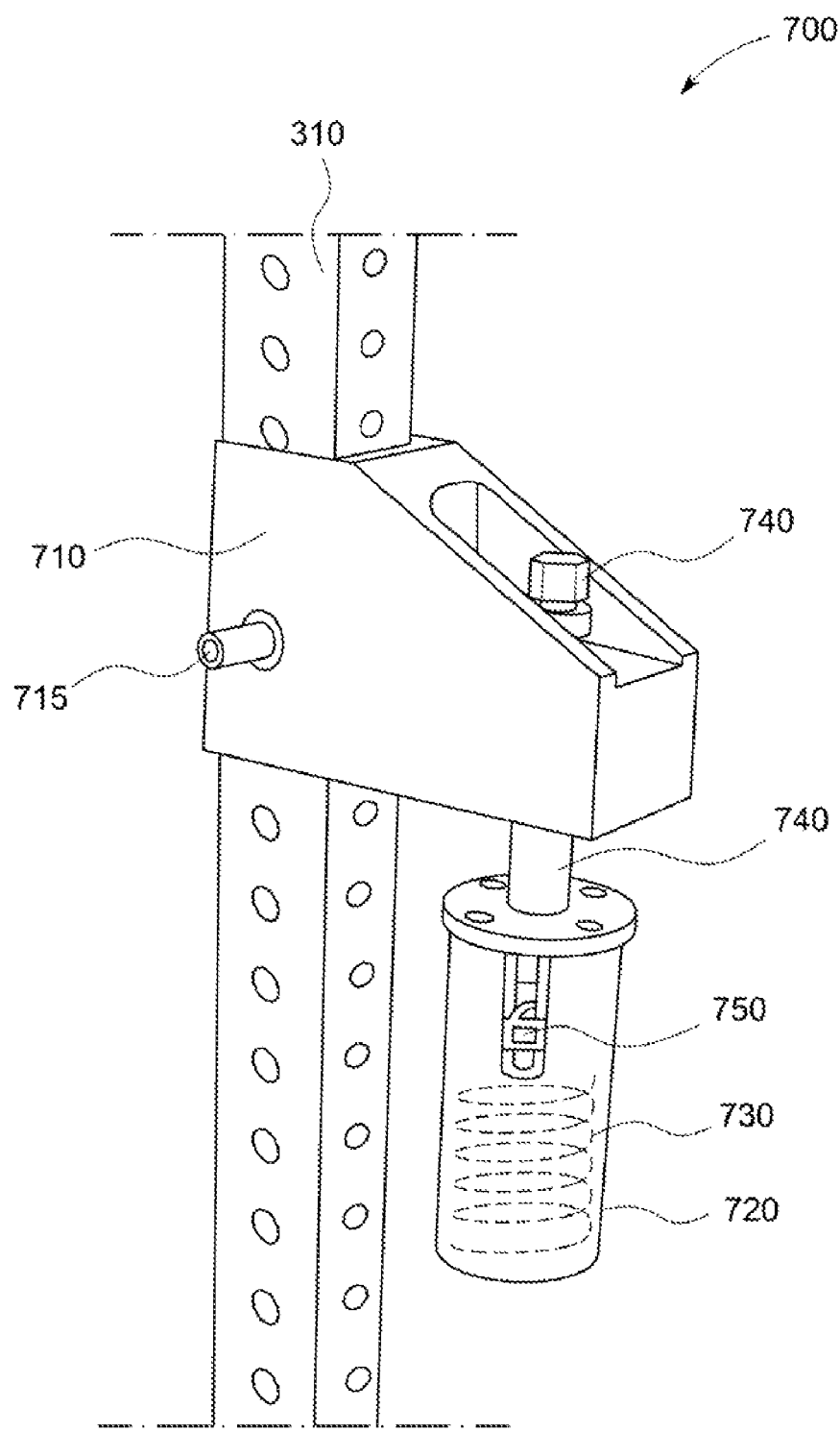
FIG. 7 illustrates an isometric view of a coil clamp mounted on a portion of the lifting rail of FIG. 3, according to an aspect of the present invention.

FIG. 7 illustrates a perspective view of a coil clamp 700 that can be used with the cart system according to aspects of the present invention. The coil clamp 700 includes a mounting bracket 710 configured to attach to lifting rail 310. A pin 715 or any suitable fastener can be used to attach the bracket 710 to various positions along the lifting rail 310. The bracket 710 supports a force application member 720, which can include an internal spring 730. An adjustment element 740 is connected to the bracket 710 and force application member 720/spring 730, and may comprise a bolt or threaded shaft. As the adjustment element is rotated, the force application member 730 can be moved up or down in the vertical direction. A force display element 750 can be incorporated to display the amount of force being applied by the clamp 700. For example, a GO-NO GO gauge could be used to indicate between desired ranges and undesired ranges of force.

Figure 8:
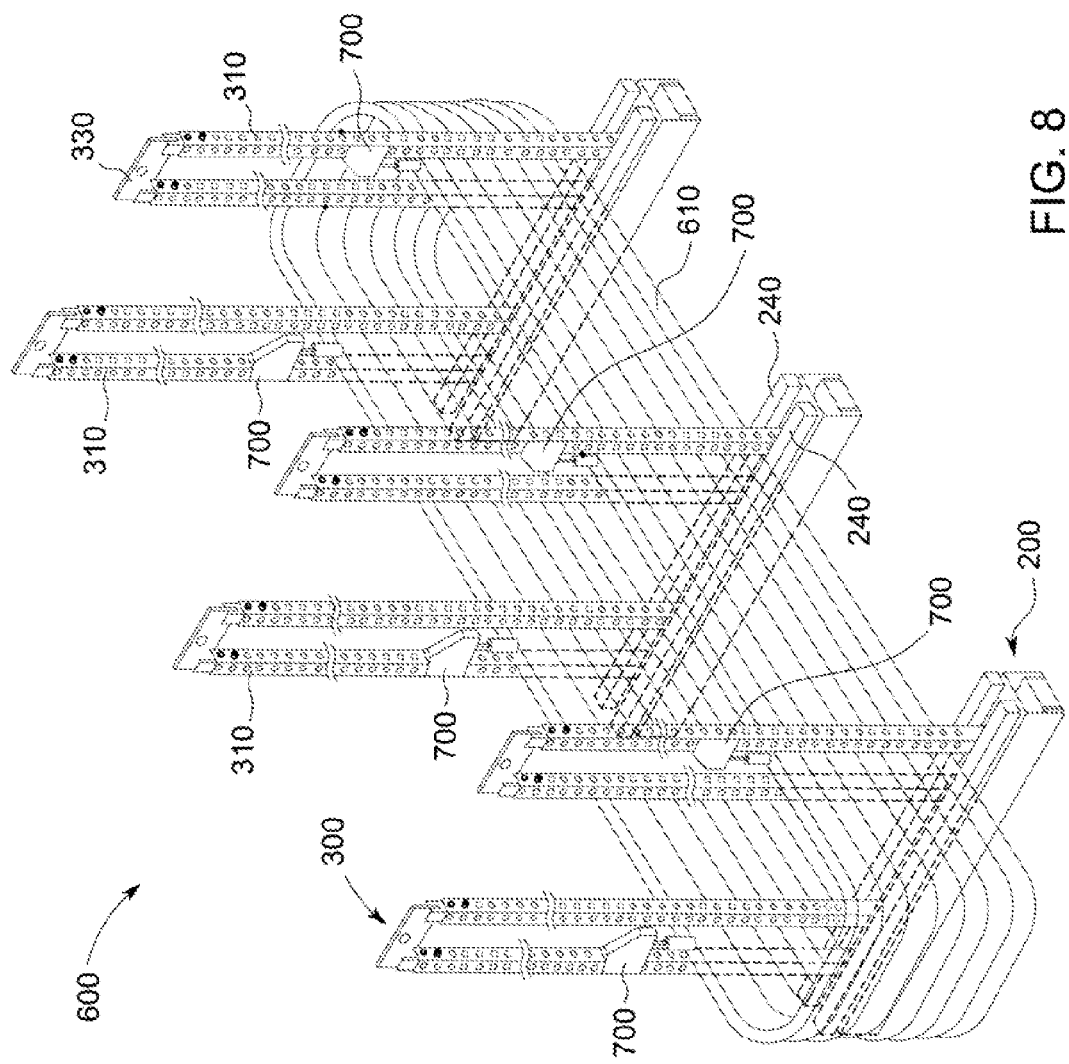
FIG. 8 illustrates a perspective view of a cart system combining the components shown in FIGS. 2-5 and 7 with a coil of a dynamoelectric machine, according to an aspect of the present invention.

FIG. 8 illustrates a perspective view of the cart system 600, including the elements shown in FIGS. 2-5 and 7, according to an aspect of the present invention. One test for coil 610 that may desired is an electrical test under load. In the past, many tubes would be laid across the top of the coil and a press machine would press down on the tubes. Usually, the amount of force was inconsistent and difficult to measure. The coil clamps 700 facilitate the application and determination of the proper amount of compressive force applied to coil 610 during compressive or "simulation under load" type tests.

In FIG. 8, a coil 610 is shown in its collapsed state (i.e., the individual turn layers are touching each other). The bottom turn layer can rest upon the coil bed members 240 or on pins 320. The coil clamps 700 can be attached to one or more lifting rails 310, so that the bottom of the force application member 720 is near the top turn layer of coil 610. To apply compressive force (e.g., to simulate a coil under load), the adjustment element 740 is rotated to lower the force application block 720 to contact the coil 610. The adjustment element 740 can continue to be rotated to apply greater levels of compressive force. The gauge 750 will indicate when a desired range of force has been applied. Once all the coil clamps are at the desired pressure or force, the chosen tests can be performed.

The present invention provides a cart system that greatly facilitates the containment, transport, manipulation and testing of stator or rotor windings and coils. The coil clamps enable an operator to easily apply the correct force and monitor this force during a variety of testing procedures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for a coil of a dynamoelectric machine, the system comprising:
   one or more support rails disposed substantially horizontally, the one or more support rails comprising generally elongate members having one or more slots disposed in a support member;
   a plurality of lifting rails disposed substantially vertically, the plurality of lifting rails connected at one end to the one or more support rails;
   a plurality of coil clamps for applying a compressive force, the plurality of coil clamps configured to be attached to the plurality of lifting rails in a removable manner;
   wherein, the coil of the dynamoelectric machine can be placed on the system and the plurality of coil clamps can be arranged on the plurality of lifting rails to apply the compressive force to the coil.

2. The system of claim 1, further comprising:
   one or more attachment point fixtures configured to be releasably fastened to the support member, the position of the one or more attachment point fixtures are adjustable by sliding the one or more attachment point fixtures along the one or more slots;
   wherein, the one or more attachment point fixtures accept and secure a lower portion of the plurality of lifting rails.

3. The system of claim 2, wherein the one or more attachment point fixtures are secured to the one or more support rails using fasteners comprising at least one of:
   a nut, a bolt, a screw, and a washer.

4. The system of claim 1, further comprising:
   at least two coil bed members located at the top of the one or more support rails, the at least two coil bed members providing a support for the coil.

5. The system of claim 1, the plurality of lifting rails comprising generally elongate members having a plurality of holes extending therethrough, the plurality of holes forming substantially horizontal passageways through each lifting rail.

6. The system of claim 5, further comprising:
   a lifting coupling attached to a top portion of two adjacent lifting rails, the lifting coupling including an attachment section for attaching a lifting element.

7. The system of claim 6, wherein the lifting coupling is attached to the lifting rails using a nut, bolt and washer fastener arrangement.

8. The system of claim 6, wherein the attachment section is a hole provided in a portion of the lifting coupling.

9. The system of claim 1, each coil clamp comprising:
   an attachment section configured for releasable attachment to a portion of one of the lifting rails, so that the coil clamp can be located in multiple positions on each lifting rail;
   a force applying section for applying the compressive force to the coil.

10. The system of claim 9, the force applying section further comprising:
    a spring housed within a force applying member;
    an adjustment element connected to the spring and force applying member, the adjustment element configured to modify the vertical position of the force applying member;
    wherein, each coil clamp can be positioned above the coil and the adjustment element can be manipulated to move the force applying member into contact with the coil, and vary the compressive force applied to the coil.

11. The system of claim 10, wherein the adjustment element is at least one of a screw and a bolt.

12. The system of claim 10, each coil clamp further comprising:
    a force display element that displays an indication of the amount of compressive force applied to the coil.

13. The system of claim 12, wherein the force display element is configured as a gauge with visual indications, where a desired range of applied force is distinguished from undesired ranges of applied force.

14. A system for a coil of a dynamoelectric machine, the system comprising:
    one or more support rails disposed substantially horizontally;
    a plurality of lifting rails disposed substantially vertically, the plurality of lifting rails connected at one end to the one or more support rails, the plurality of lifting rails comprising generally elongate members having a plurality of holes extending therethrough, the plurality of holes forming substantially horizontal passageways through each lifting rail;
    a plurality of coil clamps for applying a compressive force, the plurality of coil clamps configured to be attached to the plurality of lifting rails in a removable manner;
    wherein, the coil of the dynamoelectric machine can be placed on the system and the plurality of coil clamps can be arranged on the plurality of lifting rails to apply the compressive force to the coil.

15. The system of claim 14, further comprising:
    one or more attachment point fixtures configured to be releasably fastened to the support member, the position of the one or more attachment point fixtures are adjustable by sliding the one or more attachment point fixtures along the one or more slots;
    wherein, the one or more attachment point fixtures accept and secure a lower portion of the plurality of lifting rails.

16. The system of claim 15, wherein the one or more attachment point fixtures are secured to the one or more support rails using fasteners comprising at least one of:
    a nut, a bolt, a screw, and a washer.

17. The system of claim 14, further comprising:
    at least two coil bed members located at the top of the one or more support rails, the at least two coil bed members providing a support for the coil.

18. The system of claim 14, further comprising:
    a lifting coupling attached to a top portion of two adjacent lifting rails, the lifting coupling including an attachment section for attaching a lifting element.

19. The system of claim 18, wherein the lifting coupling is attached to the lifting rails using a nut, bolt and washer fastener arrangement.

20. The system of claim 18, wherein the attachment section is a hole provided in a portion of the lifting coupling.

21. The system of claim 14, each coil clamp comprising:
an attachment section configured for releasable attachment to a portion of one of the lifting rails, so that the coil clamp can be located in multiple positions on each lifting rail;
a force applying section for applying the compressive force to the coil.

22. The system of claim 21, the force applying section further comprising:
a spring housed within a force applying member;
an adjustment element connected to the spring and force applying member, the adjustment element configured to modify the vertical position of the force applying member;
wherein, each coil clamp can be positioned above the coil and the adjustment element can be manipulated to move the force applying member into contact with the coil, and vary the compressive force applied to the coil.

23. The system of claim 22, wherein the adjustment element is at least one of a screw and a bolt.

24. The system of claim 22, each coil clamp further comprising:
a force display element that displays an indication of the amount of compressive force applied to the coil.

25. The system of claim 24, wherein the force display element is configured as a gauge with visual indications, where a desired range of applied force is distinguished from undesired ranges of applied force.

\* \* \* \* \*